United States Patent
Jahkonen et al.

(10) Patent No.: US 6,697,273 B1
(45) Date of Patent: Feb. 24, 2004

(54) CONTROL UNIT FOR CONTROLLING A DIRECT-CURRENT LOAD

(75) Inventors: Pekka Jahkonen, Hyvinkaa (FI); Esa Putkinen, Hyvinkaa (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 10/352,205

(22) Filed: Jan. 28, 2003

Related U.S. Application Data

(63) Continuation of application No. PCT/FI02/00767, filed on Sep. 24, 2002.

(51) Int. Cl.$^7$ .................. H02M 3/24; H02M 7/5387
(52) U.S. Cl. ........................... 363/98; 363/132
(58) Field of Search .............. 363/16, 17, 97, 363/98, 131, 132; 318/801, 803, 806

(56) References Cited

U.S. PATENT DOCUMENTS

| | | | |
|---|---|---|---|
| 5,107,190 A | | 4/1992 | Schultz et al. |
| 5,703,768 A | * | 12/1997 | Kanna et al. .............. 363/98 |
| 5,757,636 A | * | 5/1998 | Fletcher ................... 363/98 |
| 5,912,813 A | * | 6/1999 | Kerkman et al. .......... 363/98 |
| 6,131,692 A | | 10/2000 | Kawasuji |
| 6,172,882 B1 | * | 1/2001 | Tanaka et al. ............. 363/17 |
| 6,486,632 B2 | * | 11/2002 | Okushima et al. ........ 318/599 |

FOREIGN PATENT DOCUMENTS

DE     3428239 A1    3/1985

OTHER PUBLICATIONS

"Single–Phase DC Drive System Controlled by Sinusoidal PWM Full–Bridge DC–DC Converter with Improved Input Current Waveform" by T.H. Abdelharnid, Department of Electrical Engineering, University of Alexandria, Egypt IEEE 1999 pp. 670–672.

* cited by examiner

*Primary Examiner*—Matthew V. Nguyen
(74) *Attorney, Agent, or Firm*—Birch, Stewart, Kolasch & Birch, LLP

(57) ABSTRACT

A control unit of controlling a direct-current load (M1), said control unit comprising a DC/DC bridge (B1) provided with controllable semiconductor switches (UT, UB, VT, VB, WT, WB) and having two bridge sections (B11, B12), one (B12) of which conducts direct current while the other one (B11) is controlled via PWM to regulate the current magnitude. The bridge section controlled via PWM consists of two bridge arms (B111, B112), and the semiconductor switches (UT, UB, VT, VB) in these bridge arms are turned on alternately.

5 Claims, 3 Drawing Sheets

CONTROL UNIT FOR CONTROLLING A DIRECT-CURRENT LOAD

This application is a Continuation of copending PCT International Application No. PCT/FI02/00767 filed on Sep. 24, 2002, which was published in English and which designated the United States and on which priority is claimed under 35 U.S.C. §120, the entire contents of which are hereby incorporated by reference.

FIELD OF THE INVENTION

The present invention relates to a control unit for controlling a direct-current load, said control unit comprising a DC/DC bridge provided with controllable semiconductor switches, said bridge having two bridge sections, one of which bridge sections conducts direct current while the other one is controlled via PWM to regulate the current magnitude.

BACKGROUND OF THE INVENTION

Elevator motor drives may be either alternating-current or direct-current motor drives. The drives may be controlled e.g. via PWM (Pulse Width Modulation). Today, alternating-current motor drives are fairly common, especially because of the simple construction of alternating-current motors. However, direct-current motor drives are still in use. Neither is it always appropriate to replace a direct-current motor drive with an alternating-current motor drive, because e.g. gearless direct-current motor drives and the direct-current motors used in them are durable and it is therefore unnecessary to replace them with alternating-current motor drives. Besides, replacing the motor entails relatively high costs.

Since the trend is towards alternating-current motor drives, it is also hardly rational to specifically develop power electronics systems for use in the control of direct-current drives. In addition, semiconductor components, such as IGBTs, used in alternating-current drives are all the time becoming increasingly efficient and economical. Moreover, it is to be expected that especially new regulations concerning network harmonics may alter the situation in future so that the use of traditional thyristor bridges used in direct-current drives will become more difficult.

SUMMARY OF THE INVENTION

The object of the invention is to eliminate the drawbacks of prior-art technology and achieve a new type of PWM-controlled control unit for controlling a direct-current load, such as a direct-current motor. The solution of the invention is based on a new principle of power electronics topology, wherein it is possible to utilize the technology of alternating-current drives in the control off direct-current motors. In the solution of the invention, a PWM-controlled bridge section consists of two bridge arms, and the semiconductor switches of the bridge arms are turned alternately into the conducting state.

The preferred embodiments of the solution of the invention are presented in the claims below.

By using the technology of the invention, it is possible to manufacture modern and economical PWM-controlled direct-current motor drives e.g. for elevator applications. By applying the invention, the power electronics technology and components of alternating-current drives manufactured in large production series can be utilized in direct-current drives. The conductor rails and other structures of the power stage can be identical to those used in alternating-current drives. In addition, the use of semiconductor switches, such as IGBTs can be optimized even in direct-current applications. And, in particular, cost savings are achieved in development and production methods as the same methods can be used in both alternating-current and direct-current drives.

BRIEF DESCRIPTION OF THE DRAWINGS

In the following, the invention will be described in detail by the aid of an example with reference to the attached drawings, wherein.

DETAILED DESCRIPTION OF THE DRAWINGS

Figure 1:
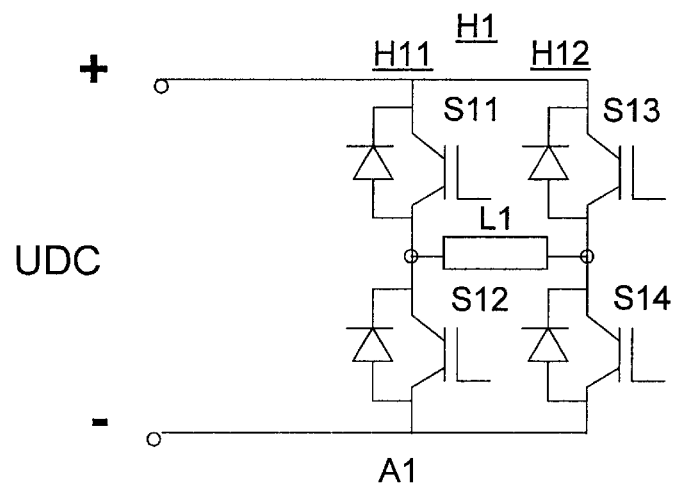
FIG. 1 presents a prior-art direct-current bridge

FIG. 1 presents a prior-art PWM-controlled H-bridge H1 of a direct-current motor drive intended e.g. for an elevator application. It consists of two bridge arms H11 and H12 connected to a direct-current source UDC, each arm containing controllable semiconductor switches S11–S14 for the positive and negative poles, consisting of e.g. an inverse parallel connection of an IGBT transistor and a diode. The bridge feeds a direct-current load L1, such as the direct-current motor of an elevator.

Figure 2:
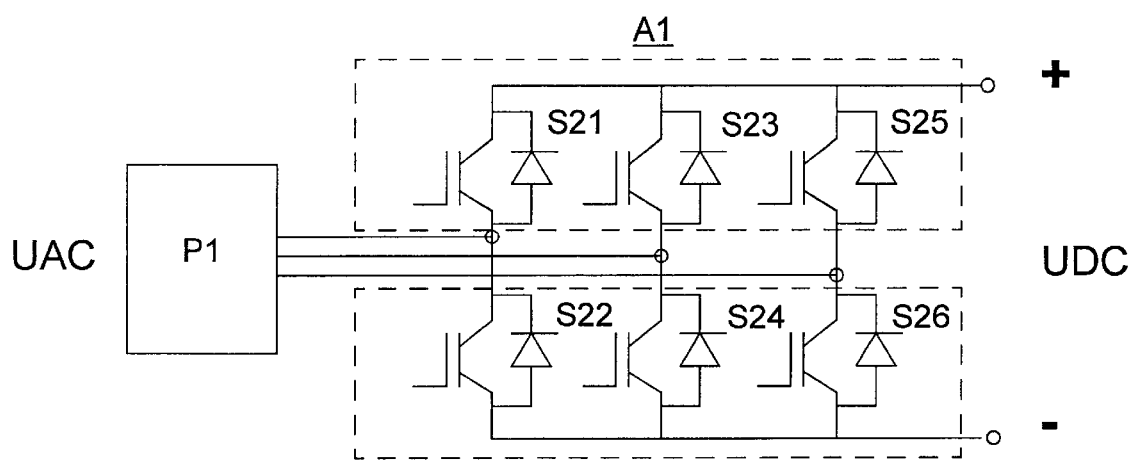
FIG. 2 presents the network bridge of an alternating-current drive.

FIG. 2 correspondingly presents a network bridge A1 as used in a prior-art three-phase alternating-current drive to rectify the alternating voltage of the network UAC into a direct voltage UDC, and an alternating-current inductor unit P1 connected before it. The bridge has in the upper and lower arms controllable semiconductor switches S21–S26, which are connected to each network phase and which may also consist of e.g. an inverse parallel connection of an IGBT transistor and a diode.

In principle, the electric motor drive of the invention is like a prior-art three-phase alternating-current drive comprising a network converter (rectifier bridge), a motor bridge and inductors. The present invention relates expressly to the DC/DC bridge feeding the motor. The network bridge and the inductors may be e.g. as presented in FIG. 2. According to the invention, the same type of controllable semiconductor switches can be used in both the rectifier bridge and the motor bridge.

Figure 3:
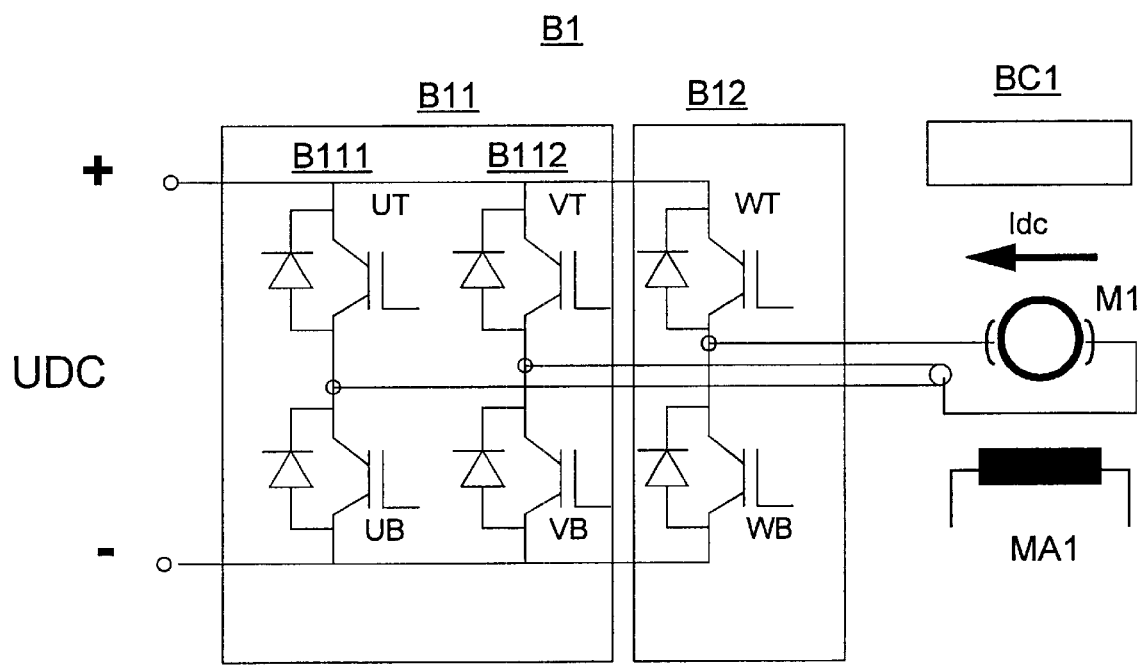
FIG. 3 presents a direct-current drive according to the invention, comprising a DC/DC bridge according to the invention.

FIG. 3 presents a DC/DC bridge B1 according to the invention, which is used to feed a direct-current motor M1, a direct current Idc flowing in the motor. The bridge is controlled by a control unit BC1. Magnetization of the motor is accomplished using a separate magnetizing unit MA1, which is controlled in a manner known in itself.

The DC/DC bridge presented in FIG. 3 comprises two bridge sections B11, B12. The first bridge section in the bridge according to FIG. 3 comprises two arms B111 and B112, each containing controllable semiconductor switches UT, UB, VT, VB for the positive pole and the negative pole. The second bridge section B12 consists of a single arm with controllable semiconductor switches WT and WB for the positive and negative poles. Thus, the bridge as a whole has three arms, corresponding to a three-phase DC/AC bridge.

The modulation of the DC/DC bridge of the invention is done as follows: The PWM-controlled direct-current drive of the invention can use the same kind of semiconductor switches for PWM control as are used in an alternating-current drive. Instead of alternating current, a zero-frequency is used (field not rotating). In the direct-current drive of the invention, not all of the semiconductor switches have to switch a high-frequency PWM control signal, typically of a frequency of a few kHz; two of the switches, WT and WB, can be used so select the torque direction (up/down), and the switches in question conduct pure DC current. The switches UT, UB, VT, VB used for PWM control are turned on/off at a frequency of a few kHz to control the magnitude of the current Icd (the torque).

Figure 4:
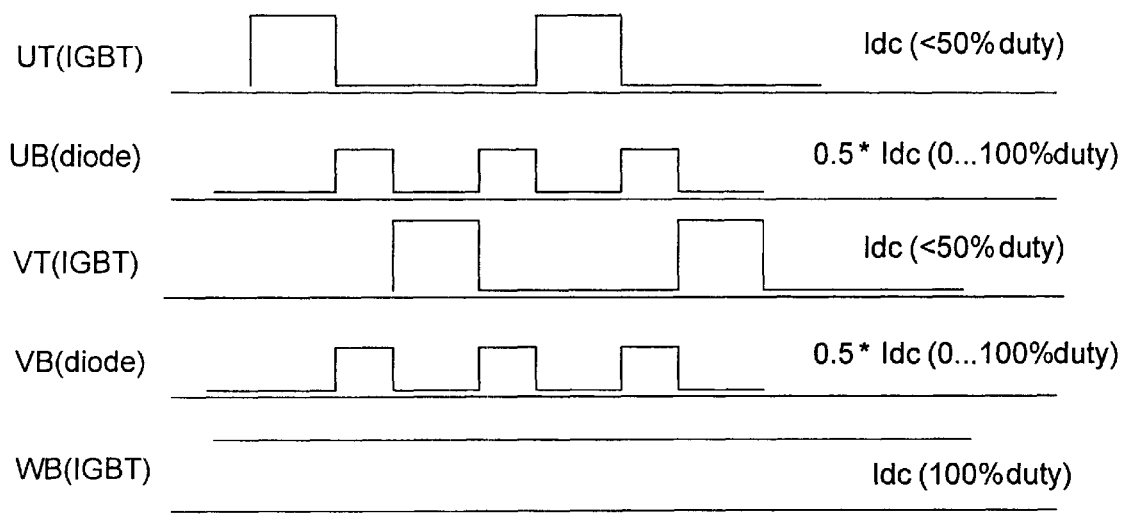
FIG. 4 presents a timing diagram for a DC/DC bridge according to the invention.

The greatest power dissipation occurs in the switches used for PWM control. In the control method of the invention, the switches used for PWM control are turned into conduction alternately in different arms, so the switches in question are only operated for about 50% of normal conduction time or less. This action is visualized in the timing diagram in FIG. 4, which represents the conduction times of switches UT, VT and WT as well as the conduction times of switches UB and diodes VB.

From a thermal point of view, the invention provides the advantage that the power stage of an alternating-current drive can be fully utilized in a direct-current drive. Thermal dissipation in the IGBTs used in the circuit is typically double the dissipation in switches that are not used in PWM control. Therefore, according to the invention, switches UT, VT and WT are only kept conducting for at most 50% of the time in a cyclic manner. The conduction period varies according to the voltage (current) required.

Figure 5:
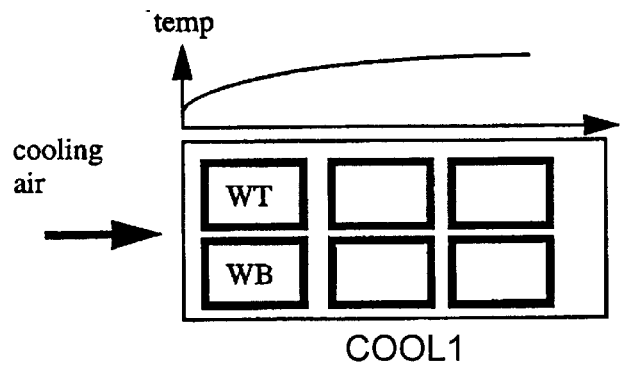
FIG. 5 illustrates the layout and cooling of the semiconductor switches of the DC/DC bridge of the invention.

In practice, direct-current switches may have higher dissipation because direct-current losses are slightly greater than switching-PWM-losses. Therefore, switches WT and WB are placed on the air intake side of the cooling segment COOL1 (FIG. 5) as it is cooler than the middle part of the segment or the air exit side, as indicated by the temperature curve TEMP.

It is obvious to the person skilled in the art that different embodiments of the invention are not limited to the examples described above, but that they may be varied within the scope of the claims presented below. Besides IGBT, the switches used may also consist of other fully gate-controlled components. Besides a direct-current motor, the load may also consist of e.g. a braking magnet of an elevator.

The arrangement of the invention can be used in a wide range of electric drives. By applying the operating principle of the invention, it will be possible to cover the power range of direct-current elevator drives using the latest IGBT technology. Alternating-current and direct-current drive modules can be assembled on the same production line, and the application can be selected mainly via software control.

What is claimed is:

1. Control unit of controlling a direct-current load (M1), said control unit comprising a DC/DC bridge (B1) provided with controllable semiconductor switches (UT, UB, VT, VB, WT, WB), said bridge having two bridge sections (B11, B12), one (B12) of which bridge sections conducts direct current while the other one (B11) is controlled via PWM to regulate the current magnitude, characterized in that the bridge section controlled via PWM consists of two bridge arms (B111, B112), in which bridge arms the semiconductor switches (UT, UB, VT, VB) are so controlled that they conduct alternately.

2. Control unit according to claim 1, characterized in that the semiconductor switches used for PWM control are so controlled that they conduct substantially for at most 50% of the conduction time of the bridge section (B11).

3. Control unit according to claim 1, wherein the semiconductor switches are mounted on a cooling base (COOL1), to which a cooling medium, such as air, is supplied, characterized in that the semiconductor switches (WT, WB) of the bridge section conducting direct current are disposed on the medium intake side.

4. Control unit according to claim 1, characterized in that the direct-current load is a direct-current motor.

5. Control unit according to claim 1, characterized in that the direct-current load is a braking magnet of an elevator.

* * * * *